United States Patent [19]
Vakil et al.

[11] Patent Number: 5,900,283
[45] Date of Patent: May 4, 1999

[54] METHOD FOR PROVIDING A PROTECTIVE COATING ON A METAL-BASED SUBSTRATE AND RELATED ARTICLES

[75] Inventors: Himanshu Bachubbai Vakil, Schenectady; Melvin Robert Jackson, Niskayuna, both of N.Y.

[73] Assignee: General Electric Company, Schenectady, N.Y.

[21] Appl. No.: 08/747,346

[22] Filed: Nov. 12, 1996

[51] Int. Cl.$^6$ .................................................. C23C 4/04
[52] U.S. Cl. ..................... 427/453; 427/456; 427/419.3; 427/419.2; 427/405; 427/255.3
[58] Field of Search .............................. 427/419.3, 419.2, 427/248.1, 255.3, 255.2, 455, 456, 453, 405

[56] References Cited

U.S. PATENT DOCUMENTS

| | | |
|---|---|---|
| 4,743,462 | 5/1988 | Radzavich et al. ........................ 427/34 |
| 4,861,618 | 8/1989 | Vine et al. ................................ 427/34 |
| 4,880,614 | 11/1989 | Strangman et al. . | |
| 5,015,502 | 5/1991 | Strangeman et al. ................. 427/248.1 |
| 5,384,200 | 1/1995 | Giles et al. . | |

OTHER PUBLICATIONS

Pierson, "Handbook Of Chemical Vapor Deposition (CVD) Principles, Technology and Applications", Noyes Publications, 1992, pp. 227–228.

*Primary Examiner*—Roy V. King
*Attorney, Agent, or Firm*—Noreen C. Johnson; Douglas E. Stoner

[57] ABSTRACT

An improved method for providing a protective coating on a metal-based substrate is disclosed. It involves the following steps:

(a) applying a rough, oxidizable metallic bond layer over the substrate;

(b) applying an intermediate layer of alumina over the metallic bond layer by chemical vapor deposition; and then (c) applying a zirconia-based thermal barrier coating over the intermediate layer by a plasma spray technique.

The intermediate layer conforms to the bond layer and chemically isolates the bond layer from the thermal barrier coating. The metal-based substrate is often made from a superalloy.

10 Claims, No Drawings

METHOD FOR PROVIDING A PROTECTIVE COATING ON A METAL-BASED SUBSTRATE AND RELATED ARTICLES

TECHNICAL FIELD

This invention relates generally to coatings technology. More specifically, it is directed to a thermal barrier coating system for metal substrates, and to improved techniques for applying these protective coatings.

BACKGROUND OF THE INVENTION

Specially-formulated coatings are very useful for protecting metal parts which are exposed to high temperatures. Aircraft engines are made from such parts. The combustion gas temperatures present in the turbine engine of an aircraft are maintained as high as possible for operating efficiency. Turbine blades and other elements of the engine are usually made of alloys which can resist the high temperature environment, e.g., superalloys, which have an operating temperature limit of about 1000 C.–1150 C. Operation above these temperatures may cause the various turbine elements to fail and damage the engine.

The protective coatings, often referred to as thermal barrier coatings or "TBC"s, effectively increase the operating temperature of the turbine engine by maintaining or reducing the surface temperature of the alloys used to form the various engine components. Most TBC's are ceramic-based, e.g., based on a material like zirconia (zirconium oxide), which is usually stabilized with another material such as yttria. For a jet engine, the coatings are applied to various surfaces, such as turbine blades and vanes, combustor liners, and combustor nozzles.

Usually, the TBC ceramics are applied to an intervening bond layer which has been applied directly to the surface of the metal part. The bond layer is often critical for improving the adhesion between the metal substrate and the TBC. Bond layers are usually formed from a material like "MCrAlY", where "M" represents a metal like iron, nickel, or cobalt. Very often, the bond layer is applied by a plasma spray technique. There, an electric arc is typically used to heat various gasses, such as air, oxygen, nitrogen, argon, helium, or hydrogen, to temperatures of about 8000 C. or greater. (When the process is carried out in an air environment, it is often referred to as air plasma or "AP".) The gasses are expelled from an annulus at high velocity, creating a characteristic thermal plume. Powder material is fed into the plume, and the melted particles are accelerated toward the substrate being coated. Plasma-formed layers usually have a very rough surface, which enhances their adhesion to a subsequently-applied TBC. As used herein, the term "TBC system" refers to the bond coat and any other intermediate coating in combination with the TBC.

The TBC itself can be applied by a variety of techniques. One popular method is referred to as electron beam physical vapor deposition (EB-PVD). In one version of this technique, an ingot of the material being deposited is placed in a chamber which is then evacuated. The top end of the ingot is then heated by an intense heat source (i.e., the electron beam), so that it melts and forms a molten pool. A portion of the very hot, molten ceramic evaporates and deposits (condenses) on a substrate positioned above the pool. In this manner, a coating is gradually built up on the substrate, as the ingot is moved upwardly to be melted and replenish the pool.

The use of EB-PVD has many advantages. The technique is especially suited for providing high-integrity coatings for parts which are difficult to coat by other methods, e.g., turbine blades having a multitude of fine cooling holes extending into the blade structure. The consistent, columnar grain structure in a coating deposited by EB-PVD results in a good thermal match between the TBC and a substrate, e.g., a superalloy component.

However, EB-PVD is not the coating technique of choice for some applications. It can be a time-consuming, expensive process which requires very specialized equipment. Moreover, the underlying surface (typically a bond coat surface) often requires a considerable amount of preparation if it is to be covered with a top coating applied by EB-PVD. For example, U.S. Pat. No. 4,880,614 (Strangman et al) describes the necessary treatment of a bond coat to make its surface very smooth and uniform. Moreover, protective coatings produced by EB-PVD sometimes have a relatively porous, "columnar" structure which allows penetration of various corrosive elements into the metallic bond coat, through fissures between the columns of the deposit. This occurrence can in turn lead to spallation.

Thus, plasma-spray techniques are often a very desirable alternative for applying TBC's to various metal substrates, such as turbine combustor parts. These techniques do not usually require the expensive equipment employed in EB-PVD. Furthermore, plasma spray systems are very well suited for coating large parts, with maximum control over the thickness and uniformity of the coatings. One exemplary TBC which has been of great interest in the turbine engine industry is based on zirconia ($ZrO_2$), usually stabilized with a compound such as yttria ($Y_2O_3$).

While there are obviously advantages to the use of plasma-sprayed coatings, there are also drawbacks in some situations. Some of the disadvantages result from the very high temperatures to which parts such as turbine engine components are exposed during service, as mentioned previously. These temperatures usually promote some oxidation of the various elements in a bond coat like MCrAlY. Typically, alumina becomes the predominant oxidation product originating with the bond coat, and an alumina layer begins to form at the interface of the bond coat and the TBC.

Moreover, the elevated temperatures sometimes lead to undesirable chemical reaction between the bond coat and the TBC—especially when the TBC is zirconia-based and plasma-sprayed. This in turn can lead to a further build-up of alumina and other weaker oxides, causing stresses at the interface between the bond coat and the TBC, and within each coating itself. These stresses can eventually result in spallation within the TBC, which if unchecked, can ultimately cause the TBC to fail and lead to damage of the underlying substrate.

Thus, a method for isolating a plasma-deposited TBC from an underlying bond coat would be welcome in the art. The method should also preferably retard the growth of the above-mentioned alumina layer which results from oxidation. Moreover, the method should still produce a protective coating with all of the desirable performance characteristics of prior art coatings. This is especially true when the substrate is a high performance article like an aircraft engine part.

SUMMARY OF THE INVENTION

The needs discussed above have been substantially satisfied by the discovery which forms the basis for the present invention. In one aspect, this invention embraces an improved method for providing a protective coating on a metal-based substrate, comprising the following steps:

(a) applying a rough, oxidizable metallic bond layer over the substrate;

(b) applying an intermediate layer of alumina over the metallic bond layer by chemical vapor deposition; and then (c) applying a zirconia-based thermal barrier coating over the intermediate layer by a plasma spray technique.

The intermediate layer conforms to the bond layer and chemically isolates the bond layer from the thermal barrier coating. The metal-based substrate is often made from a superalloy.

Another embodiment of this invention relates to an article, which comprises:

(i) a metal-based substrate;

(ii) a rough, oxidizable metallic bond layer over the substrate;

(iii) an intermediate layer of alumina over the metallic bond layer, deposited by chemical vapor deposition; and (iv) a zirconia-based thermal barrier coating over the intermediate layer, applied by a plasma spray technique.

As mentioned previously, the intermediate layer conforms to the bond layer and chemically isolates the bond layer from the thermal barrier coating. The article is often a component for a turbine engine.

Details regarding the various embodiments of this invention and its accompanying advantages will be presented in the detailed description which follows.

DETAILED DESCRIPTION OF THE INVENTION

The metal-based substrate can be any metallic material or alloy which is amenable to protection by a thermal barrier coating. As used herein, "metal-based" refers to substrates which are primarily formed of metal or metal alloys, but which may also include some non-metallic components, e.g., ceramics, intermetallic phases, or intermediate phases. Often, the substrate is a heat-resistant alloy. Many of these materials are referred to as "superalloys", and they typically have an operating temperature of up to about 1000–1150 C. They are described in various references, such as U.S. Pat. Nos. 5,399,313 and 4,116,723, both incorporated herein by reference. High temperature alloys are also generally described in Kirk-Othmer's *Encyclopedia of Chemical Technology*, 3rd Edition, Vol. 12, pp. 417–479 (1980), and Vol. 15, pp. 787–800 (1981). Illustrative nickel-base alloys are designated by the trade names Inconel, Nimonic, Rene (e.g., Rene 80-, Rene 95 alloys), and Udimet. As mentioned above, the type of substrate can vary widely, but it is often in the form of a jet engine part, such as the combustor liner of a turbine engine. As another example, the substrate may be the piston head of a diesel engine, as well as any other surface requiring a heat-resistant barrier coating.

In the present invention, a bond coat layer is first applied to the substrate to promote adhesion between the substrate and the subsequently-applied thermal barrier coating. Suitable bond coat layers are known in the art and described, for example, in U.S. Pat. Nos. 5,419,971 and 5,043,138, both incorporated herein by reference. The bond coating usually has a thickness in the range of about 2 mils to about 12 mils, and preferably, in the range of about 5 mils to about 10 mils. As mentioned previously, preferred bond coatings for this invention have the formula MCrAlY, where "M" can be various metals or combinations of metals, such as iron, nickel, or cobalt. These alloys often have a broad composition of about 17.0–23.0% chromium; about 4.5–12.5% aluminum; and about 0.1–1.2% yttrium; with M constituting the balance. This type of material is quite "oxidizable" (i.e., capable of being oxidized), since each component in the compound can undergo oxidation.

It should be understood that the formation of a certain degree of oxidized material, for example protective aluminum oxide ($Al_2O_3$) scales, can enhance the stability of the subsequently-applied thermal barrier coating, since it inhibits further oxidation. However, excessive oxidation often results in the problems described above. An instructive discussion on oxidation activity and related phenomena in high temperature alloys can be found in Kirk-Othmer's *Encyclopedia of Chemical Technology*, 3rd Edition, Vol. 12, pp. 427–431 (1980).

The bond coating may be applied by a variety of conventional techniques, such as physical vapor deposition; plasma spray or other thermal spray deposition methods such as High Velocity Oxy-Fuel (HVOF), detonation or wire spray; Chemical Vapor Deposition (CVD); or combinations of plasma spray and CVD techniques. In preferred embodiments, a plasma spray technique, as briefly described previously, is employed to deposit the bond coat layer. Specific, non-limiting examples of this technique are low pressure plasma spraying and air plasma spraying. Details regarding plasma spraying can also be found, for example, in Kirk-Othmer's *Encyclopedia of Chemical Technology*, 3rd Edition, Vol. 15, (1981) and Vol. 20 (1982); in *Ullmann's Encyclopedia of Industrial Chemistry*, Fifth Edition; Volume A6, VCH Publisher (1986); in *Scientific American*, H. Herman, September, 1988; and in U.S. Pat. No. 5,384,200, incorporated herein by reference. Thus, one of ordinary skill in the art can easily become familiar with various process details which may be relevant, e.g., cleaning of the surface prior to deposition; grit blasting to remove oxides and roughen the surface; spray distances; selection of the number of spray-passes; gas temperature; powder feed rate; powder particle size and size distribution; heat treatment after deposition; or any other type of treatment after deposition.

As mentioned above, plasma-formed bond layers for this invention have a rough surface, which enhances adhesion to a subsequently-applied TBC. An optimum surface roughness is in the range of about 100 micro-inches to about 2000 micro-inches, and preferably, in the range of about 200 micro-inches to about 1000 micro-inches. In some embodiments, the optimum surface roughness is in the range of about 350 micro-inches to about 700 micro-inches. Surface roughness less than the acceptable range may prevent formation of a lasting mechanical bond with a subsequently-applied layer, resulting in loss of adhesion during the service life of the part—especially when it is exposed to cyclical temperatures. Surface roughness greater than the acceptable range may cause surface peaks to fold over and break off, thus reducing the available surface area and also causing loss of adhesion.

After the metallic bond layer has been applied over the substrate, an intermediate layer of alumina is applied over the bond layer. Since the primary purpose of the intermediate layer is to chemically isolate the bond layer from the TBC, it must conform very closely to the rough, contoured surface of the bond layer. Usually, the intermediate layer covers at least about 80% of the surface area of the bond layer. In preferred embodiments, the intermediate layer covers at least about 95% of the bond layer, and in most preferred embodiments, covers at least about 99% of the bond layer. CVD is the preferred method for depositing the intermediate layer and ensuring such conformance.

CVD techniques are well-known in the art and described in a large number of references, such as Kirk-Othmer's *Encyclopedia of Chemical Technology*, 3rd Edition, Vol. 15, (1981) and Vol. 20 (1982). Relevant references describe various CVD processes for a variety of applications.

A high-temperature CVD technique may be used to deposit the intermediate layer. As used herein, "high-temperature" refers to deposition at a temperature in the range of about 1000° C. to about 1200° C. Usually, the alumina is formed as the reaction product of a reagent mixture comprising an aluminum halide compound, hydrogen, and an oxidizing agent, such as water, oxygen, or carbon dioxide.

Alternatively, a low-temperature CVD technique may be used to deposit the alumina. "Low temperature" as used herein refers to any temperature below the high-temperature range. It is usually in the range of about 450 C. to about 650 C. Low temperature CVD is generally described in various references, such as *Thin Film Processes*, edited by J. L. Vossen et al, Academic Press (1978). In many embodiments, the low-temperature technique involves the formation of alumina from a metal organic precursor (e.g., metal alkoxides), and is sometimes referred to as "metal-organic CVD" (MOCVD). Specific examples of suitable metal organic compounds are aluminum isopropoxide and aluminum di(isopropoxide) acetoacetic ester chelate.

The layer of alumina which is deposited by the low-temperature technique is usually amorphous or partially amorphous. Substantially all of the alumina will be converted to the desirable alpha phase when the substrate is exposed to high temperatures during its service life. The alpha phase is more crystalline and less impervious to oxygen. However, the phase conversion may create stresses in the coating. Therefore, some embodiments of this invention contemplate a heat treatment of the alumina after its deposition, according to a time and temperature schedule sufficient to convert substantially all of the alumina from the amorphous phase to the alpha phase. Usually, the heat treatment would be carried out at a temperature of about 1000 C. to about 1250 C., for a time period in the range of about 150 minutes to about 600 minutes. The temperature must be high enough to ensure phase conversion, but not so high that the substrate would be damaged by excessive thermal exposure.

Numerous other details regarding CVD are known in the art, and are routinely considered by those of ordinary skill. For example, in planning for CVD deposition, the melting point of the substrate and the bond coat is taken into consideration. Their susceptibility to chemical attack by the reacting gasses or by their side-products is also considered. Control of the gaseous reagents entering the reactor is also maintained, based on known hydrodynamic and diffusion parameters.

In some embodiments, plasma-assisted CVD processes may be used to deposit the alumina coating. Plasma techniques are known in the art and described in many references, such as the Kirk-Othmer treatise noted above. Deposition usually occurs at a relatively low temperature, about 50° C. to about 300° C., since the deposition reaction is assisted by the energy present in the plasma.

The intermediate layer of alumina should preferably have a thickness which is much smaller than the scale of roughness for the bond coat. This helps to ensure good adhesion to the subsequently-applied TBC. Usually, the thickness is in the range of about 0.5 micron to about 5 microns. In preferred embodiments, the thickness is in the range of about 1 micron to about 2 microns.

A zirconia-based thermal barrier coating is then applied over the intermediate layer by a plasma spray technique. As used herein, "zirconia-based" embraces ceramic materials which contain at least about 75% zirconia. Zirconia is a well-known compound for barrier coatings, and is described, for example, in Kirk-Othmer's *Encyclopedia of Chemical Technology*, 3rd Edition, V. 24, pp. 882–883 (1984). In preferred embodiments, the zirconia is stabilized by being blended with a material such as yttrium oxide, calcium oxide, magnesium oxide, cerium oxide, scandium oxide, or mixtures of any of those materials. In one specific example, zirconia can be blended with about 1% by weight to about 20% by weight yttrium oxide, and preferably, from about 3%–10% yttrium oxide.

The plasma-spray techniques suitable for applying the TBC have been previously described herein and in the various references. Again, those of ordinary skill in the art can selectively perform the routine preparation steps and adjust the various process parameters, such as surface pre-treatments; plasma spray distances; selection of spray distance and the number of spray-passes; gas temperature; powder feed rate; powder particle size and size distribution; heat treatment after deposition; oxidation control to control oxide stoichiometry; and the like. Various factors will be considered, such as the particular composition of the zirconia-based TBC, and the end use of the part being coated. The thickness of the TBC will depend in part on the particular component being coated. Usually its thickness will be in the range of about 3 mils to about 45 mils. In preferred embodiments for end uses such as airfoil components, the thickness is often in the range of about 8 mils to about 30 mils.

It should be apparent that another embodiment of this invention is a coated article, such as a superalloy component, which comprises:

(i) a metal-based substrate;
(ii) a rough, oxidizable metallic bond layer over the substrate;
(iii) an intermediate layer of alumina over the metallic bond layer, deposited by chemical vapor deposition; and
(iv) a zirconia-based thermal barrier coating over the intermediate layer, applied by a plasma spray technique.

The alumina layer usually has a thickness of about 0.5 micron to about 5 microns, and preferably, about 1 micron to about 2 microns. As described previously, it conforms to the bond layer and chemically isolates the bond layer from the thermal barrier coating, while also retarding the growth rate of scale-oxide formation, by acting as a diffusion barrier to the passage of oxygen. Thus, the life of the coated article is extended which is a key advantage for high-performance parts like those found in a turbine engine. Moreover, the economic benefits of utilizing thermal-spray techniques instead of EB-PVD for the bond coat and thermal barrier coating are realized without any sacrifice in the integrity of the coating system.

While preferred embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the claimed inventive concept.

What is claimed:

1. A method for providing a protective coating on a metal-based substrate, comprising the following steps:

(a) applying an oxidizable metallic bond layer over the substrate by a plasma-spray technique, said metallic bond layer having a surface roughness in the range of about 200 micro-inches to about 1000 micro-inches;

(b) applying an intermediate layer of alumina over the metallic bond layer by chemical vapor deposition, said alumina layer having a thickness in the range of about 0.5 micron to about 5 microns; and then (c) applying a zirconia-based thermal barrier coating over the intermediate layer by a plasma spray technique;

wherein the intermediate layer is heat-treated to convert substantially all of the alumina from an amorphous phase to an alpha phase, and wherein the intermediate layer conforms to the bond layer and chemically isolates the bond layer from the thermal barrier coating.

2. The method of claim 1, wherein the metallic bond layer comprises an alloy of the formula MCrAlY, where M is selected from the group consisting of iron, nickel, cobalt, and mixtures thereof.

3. The method of claim 1, wherein the intermediate layer of alumina covers at least about 95% of the bond layer.

4. The method of claim 1, wherein the intermediate layer is applied by a high temperature chemical vapor deposition technique, and the deposition temperature is in the range of about 1000 C. to about 1200 C.

5. The method of claim 4, wherein the intermediate layer of alumina is the reaction product of a reagent mixture comprising an aluminum halide compound, hydrogen, and an oxidizing agent.

6. The method of claim 5, wherein the oxidizing agent is carbon dioxide.

7. The method of claim 1, wherein the intermediate layer of alumina is applied by a low temperature chemical vapor deposition technique, and the deposition temperature is in the range of about 450 C. to about 650 C.

8. The method of claim 7, wherein the alumina layer is formed from a metal organic precursor selected from the group consisting of aluminum isopropoxide and aluminum di(isopropoxide) acetoacetic ester chelate.

9. The method of claim 1, wherein the plasma spray technique for applying the thermal barrier coating utilizes an air plasma.

10. The method of claim 1, wherein the metal-based substrate is a superalloy.

* * * * *